United States Statutory Invention Registration [19]

[11] Reg. Number: H978

Gaal et al. [43] Published: Nov. 5, 1991

[54] HOT CELL EXAMINATION TABLE

[75] Inventors: Peter S. Gaal, Monroeville, Pa.; Lino P. Ebejer, Weston, Mass.; James H. Kareis, Slickville; Gary L. Schlegel, McKeesport, both of Pa.

[73] Assignee: The United States of America as represented by the United States Department of Energy, Washington, D.C.

[21] Appl. No.: 515,307

[22] Filed: Apr. 27, 1990

[51] Int. Cl.[5] ..... A47B 85/00

[52] U.S. Cl. ..... 108/20; 108/137

[58] Field of Search ..... 108/20, 137, 139, 143; 74/89

[56] References Cited

U.S. PATENT DOCUMENTS

| | | | |
|---|---|---|---|
| 4,638,756 | 12/1986 | Kimura | 108/143 |
| 4,726,242 | 2/1988 | Baghdasarian | 74/89 |
| 4,729,536 | 3/1988 | Scala | 108/143 |
| 4,922,782 | 5/1990 | Kawai | 74/479 |

*Primary Examiner*—Michael J. Carone

*Attorney, Agent, or Firm*—Judy K. Kosovich; William R. Moser; Richard E. Constant

[57] ABSTRACT

A table for use in a hot cell or similar controlled environment for use in examining specimens. The table has a movable table top that can be moved relative to a table frame. A shaft is fixedly mounted to the frame for axial rotation. A shaft traveler having a plurality of tilted rollers biased against the shaft is connected to the table top such that rotation of the shaft causes the shaft traveler to roll along the shaft. An electromagnetic drive is connected to the shaft and the frame for controllably rotating the shaft.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HOT CELL EXAMINATION TABLE

The Government has rights in this invention pursuant to Contract No. N00024-79C-4026 awarded by the U.S. Department of Energy.

BACKGROUND OF THE INVENTION

1. Field of the Invention

This invention relates to tables for use in examination procedures and, more particularly, to a table having a movable table top.

2. Prior Art

To perform photographic, microscopic, photomicrographic and visual examination on small parts and components, especially specimens that may be radioactive, it is customary to execute these operations in a controlled environment. One such controlled environment for radioactive specimens is called a hot cell. The hot cell often has appropriate optical apparati that protrude through the protective walls of the hot cell. In order to manipulate the specimen or object under the optical viewer, remotely controlled stages are used to move the object.

It is also known to use tilted rollers biased against a rotatable shaft such that when the shaft is rotated, the biased tilted rollers frictionally roll along the shaft to move an article connected to the rollers.

It is an objective of the present invention to provide an examination table with a movable table top with minimal maintenance requirements for use in a hostile environment.

It is another objective of the present invention to provide an examination table with a movable table top having an overdrive capability to eliminate safety limit switches for the bounds of the table top travel.

It is another objective of the present invention to provide an examination table with a movable table top having a removable drive module with a minimum number of fasteners for readily removing and replacing the drive module using remote handling means such as manipulators, etc.

SUMMARY OF THE INVENTION

The foregoing problems are overcome and other advantages are provided by an examination table having a movable table top.

In accordance with one embodiment of the invention the table has a frame, a movable table top and means for controllably moving the table top relative to the frame. The moving means comprises shaft means, drive means and shaft travel means. The shaft means is fixedly mounted to the frame for axial rotation. The drive means is connected to the frame and shaft means for rotating the shaft means. The shaft travel means comprises a plurality of tilted rollers, means for biasing the tilted rollers against the shaft means and means for connecting the shaft travel means to the table top such that rotation of the shaft means causes the tilted rollers to frictionally roll along the shaft means whereby the table top is moved parallel to the shaft means as the shaft means is rotated.

In accordance with another embodiment of the invention, the table has a table top moving means comprising a shaft means, drive means and a single fastener. The shaft means is mounted to the frame for axial rotation and has a central aperture and a first gear at one end. The drive means is provided for rotating the shaft means and has a motor means, a drive shaft and a pinion gear means. The drive shaft has a second gear and is insertable into the shaft means central aperture with the pinion gear means connecting the first and second gears. The single fastener is provided for mounting the drive means to the frame.

BRIEF DESCRIPTION OF THE DRAWINGS

The foregoing aspects and other features of the invention are explained in the following description, taken in connection with the accompanying drawings wherein.

DETAILED DESCRIPTION OF THE INVENTION

Figure 1:
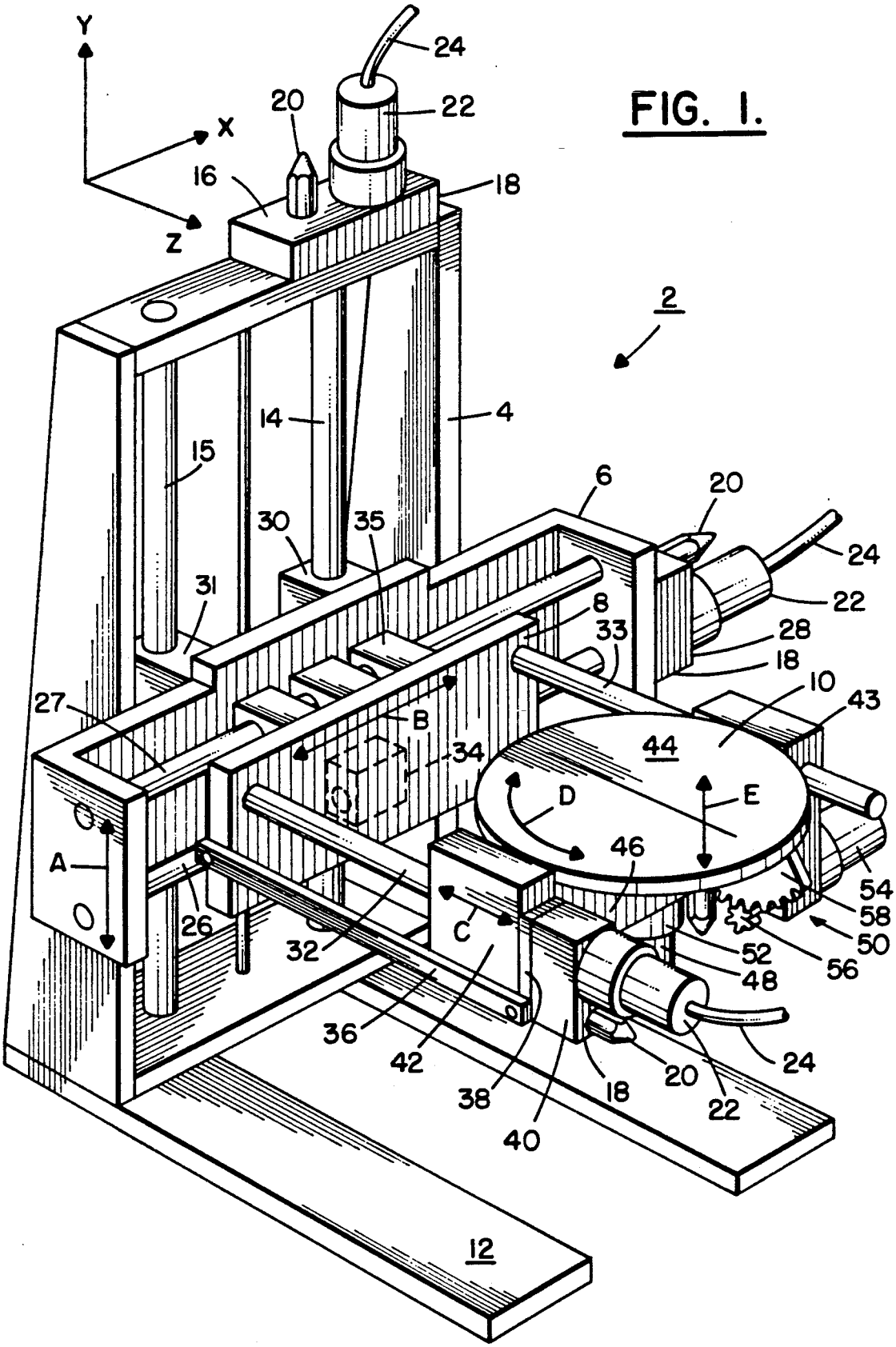
FIG. 1 is a schematic perspective view of a hot cell examination table incorporating features of the invention.

Referring to FIG. 1, there is shown one embodiment of an examination table 2 incorporating features of the present invention. The table 2 is generally used to perform photographic, microscopic, photomicrographic and visual examination on small parts and components such as radioactive parts and components in a radioactive hot cell (not shown). The hot cell would of course have appropriate optical apparati that would protrude through the protective walls of the hot cell. In order to manipulate the small part, component or object under the optical apparati, the table 2 is capable of moving the object relative to the optical apparati via remote controlled stages as will be described below.

The table 2, in this embodiment, generally comprises a first frame member 4, a second frame member 6, a third frame member 8 and a table top assembly 10. The table 2 also generally comprises a base 12 which is intended to be relatively stationarily positioned in the hot cell (not shown). The first frame member 4 is generally fixedly connected to the base 12 and, in the embodiment shown, extends vertically upward in the Y direction. In this embodiment, the first frame member 4 generally comprises two vertically extending bars or shafts 14 and 15 which are both fixedly mounted to the first frame member 4. However, the first shaft 14, in the embodiment shown, is also rotatably mounted with the first frame member 4 for axial rotation about its center axis. Mounted on top of the first frame member 4, in the embodiment shown, is an electromechanical drive module 16. The drive module 16 generally comprises a frame 18, a fastener 20, a drive motor 22 and an electrical conduit 24 for supplying power to the drive motor 22 and which can also be used for transmitting signals from a computer and/or control panel (not shown) located outside of the hot cell.

The second frame member 6 is generally provided for movement in the vertical Y direction along the first and second shafts 14 and 15 of the first frame member 4. The second frame member 6 generally has two horizontal bars or shafts 26 and 27 positioned along the X axis which are both fixedly mounted with the second frame member 6. However, the third shaft 26 is also mounted for axial rotation along its center axis. Mounted on the side of the second frame member 6 is a second electromechanical drive module 28 which is substantially identical to the first electromechanical drive module 16 and thus, like numbers are used to identify similar parts. The second frame member 6, in the embodiment shown, also comprises two shaft travel mechanisms 30 and 31 which are fixedly connected to the second frame member 6. The first travel shaft mechanism 30 has the first shaft 14 of the first frame member 4 passing therethrough. As will be described below, the first shaft travel mechanism 30, when the first shaft 14 is rotated, is capable of moving the second frame member 6, the third frame member 8 and the table top assembly 10 up and down in the vertical Y direction depending upon the direction of rotation of the first shaft 14. The second shaft travel mechanism 31 generally has the second shaft 15 of the first frame member 4 passing therethrough. Suitable means are provided in the second travel mechanism 31, such as a bearing means, that allows the second shaft travel mechanism 31 to move relatively freely up and down the shaft 15 while also providing movement stability of the second frame member 6 as it moves up and down along the first and second shaft 14 and 15 as generally indicated by the arrow A.

The third frame member 8 is generally provided for movement in the horizontal X direction. Connected to the frame 8, in the embodiment shown, are a fifth shaft 32, a sixth shaft 33, a third shaft travel mechanism 34, a fourth shaft travel mechanism 35 and a frame extension 36. The third shaft travel mechanism 34 and the fourth shaft travel mechanism 35 are substantially identical to the first and second shaft travel mechanisms 30 and 31, respectively. With the axial rotation of shaft 26, the third shaft travel mechanism 34 is capable of moving the third frame 8 and the table top assembly 10 in the horizontal X direction as indicated by arrow B depending upon the direction of rotation of the third shaft 26. The fourth shaft travel mechanism 35 is substantially identical to the second shaft travel mechanism 31 in that suitable means are provided (not shown) such that as the frame 8 moves along the shafts 26 and 27 the fourth shaft travel mechanism 35 allows the frame 8 to move relatively freely along the fourth shaft 27 while also providing stability to the cantilevered table top assembly 10. The frame extension 36 generally extends from the third frame member 8 in the Z direction and has an end plate 38 which has a third electromechanical drive module 40 mounted thereto. In the embodiment shown, the third electromechanical drive module 40 is substantially identical to the first and second electromechanical drive modules 16 and 28, therefore, like numbers are used to represent like parts. The sixth shaft 33 is generally fixedly mounted with the third frame member 8. The fifth shaft 32 is generally mounted to the third frame member 8 and the end plate 38 for axial rotation therebetween. The table top assembly 10 is generally connected to the fifth and sixth shafts 32 and 33 via a fifth shaft travel mechanism 42 and a sixth shaft travel mechanism 43. The fifth travel mechanism 42 is substantially identical to the first and third shaft travel mechanism 30 and 34. The table top assembly 10 generally also comprises a table top member 44, a frame 46, a rotation mechanism 48 and a tilt mechanism 50. The frame 46 is connected to the fifth and sixth shaft travel mechanisms 42 and 43 such that rotation of the fifth shaft 32 results in movement of the table top assembly 10 in the Z direction indicated by arrow C. The rotation mechanism 48 generally comprises a fourth electromechanical drive module 52 which is substantially identical to the other electromechanical drive modules of the table. The fourth electromechanical drive module 52 allows the table top member 44 to rotate as indicated by arrow D. The tilt mechanism 50 generally comprises a fifth electromechanical drive mechanism 54 having a gear 56 that can move a tilt member 58 which is connected to the frame 46 for tilting the frame 46 and thus tilting the table top member 44 as indicated by arrow E.

Figure 2:
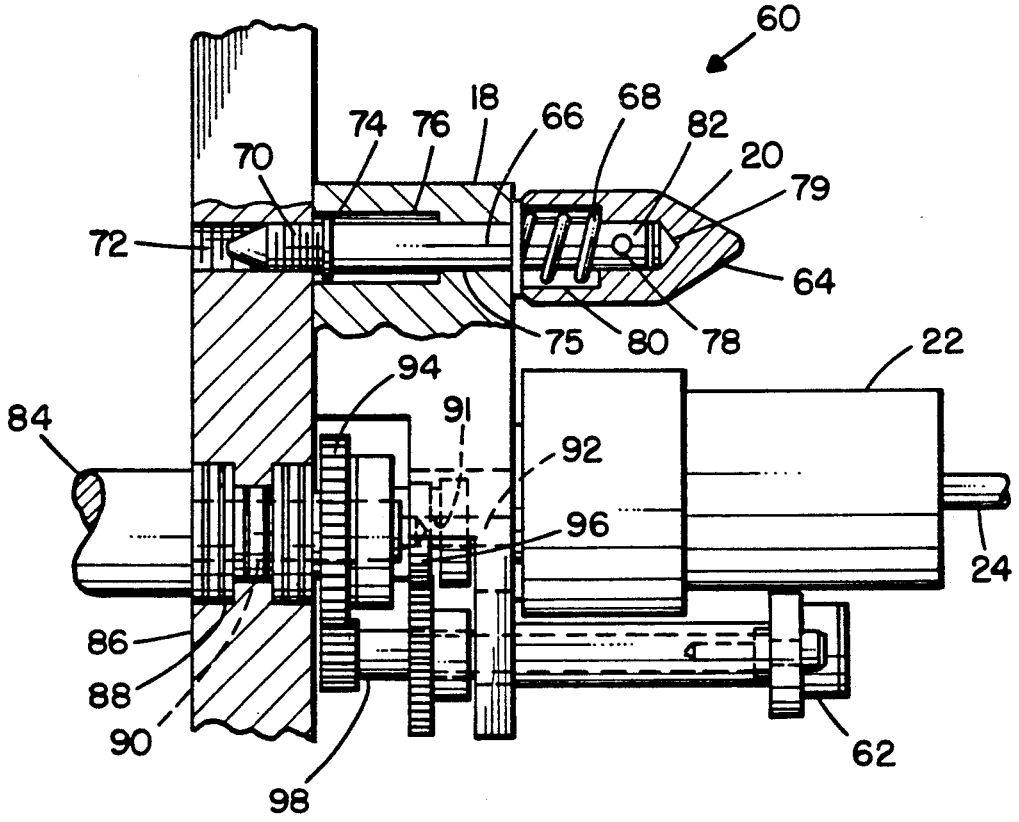
FIG. 2 is a schematic partial cross-sectional view of a drive module.

Referring now to FIG. 2, one embodiment of an electromechanical drive module is shown. As described above, the first, second, third, fourth and fifth drive modules 16, 28, 40, 52 and 54 are substantially identical to each other. Each module comprises a frame 18, a fastener 20, a drive motor 22 and an electrical conduit 24. In the embodiment shown in FIG. 2 the drive module 60 also comprises a potentiometer 62 to detect turns within the module 60. The fastener 20, in the embodiment shown, generally comprises a fastener head 64, a shaft 66 and a spring 68. The shaft 66 has a first end 70 with threads thereon to engage a threaded hole 72 located in each of the first frame member 4, second frame member 6, end plate 38, table top frame 46 and sixth shaft travel mechanism 43. The module frame 18 comprises an aperture 75 for passage of the shaft 66 therethrough. The aperture 75 also includes an enlarged aperture portion 76. A clip 74 is attached to the shaft 66 proximate the threaded portion 70 and prevents the shaft 66 from being removed from the aperture 75 while also allowing limited movement within the aperture 75 when the module 60 is not attached to the table 2. The fastener head 64 generally comprises a receiving aperture 79 for receiving a second end 82 of the shaft 66. A pin 78 fixedly attaches the fastener head 64 to the second end 82 of the shaft. The fastener head 64 also comprises an enlarged portion 80 of the receiving aperture 79 which has the spring 68 at least partially contained therein, the spring being compressed between the fastener head 64 and the module frame 18. The spring loaded fastener 20 allows for easy mounting and dismounting of the module 60 such that the threaded end 70 of the shaft 66 does not interfere with positioning of the module 60 on the table 2 and also allows for quick removal of the module 60 when the threaded end 70 of the shaft 66 is unthreaded from the threaded hole 72.

In the embodiment shown in FIG. 2 a shaft 84 is shown which is rotatably mounted in a frame 86 for axial rotation. The shaft 84 generally symbolizes either the first shaft 14, third shaft 26, fifth shaft 32, a shaft extending between the table top member 44 into the frame 46 or a shaft extending from the gear 56 into the sixth travel mechanism 43. The frame 86 is generally intended to symbolize either the first frame member 4, second frame member 6, end plate 38, table top frame 46 or sixth shaft travel mechanism 43. In the embodiment shown in FIG. 2, suitable bearing means 88 are provided such that the shaft 84 can rotate within the frame 86. The end 90 of the shaft 84, in this embodiment, extends past the frame 86 into a central aperture 91 of a mating co-axial shaft 92 extending from the drive motor 22. In an alternate embodiment of the invention, the shaft 92 may extend into a central aperture of the shaft 84. The end of the shaft 84 also comprises a gear 94 fixedly connected thereto. The mating shaft 92 extending from the drive motor 22 also comprises a gear 96 fixedly connected thereto. Both the gears 94 and 96 of the mating shaft 92 and the shaft 84, in the embodiment shown, have identical gear sizes thereon. The shaft end 90 of shaft 84 and the central aperture 91 have a circular cross-section such that the two shafts 84 and 92 can be mated at any desired orientation. However, the actual power coupling between the shaft 92 and shaft 84 is accomplished with an idler pinion gear 98 connecting the two gears 94 and 96. The modular frame 18 has a suitable aperture for positioning of the shafts and gears therein. In attaching the module 60 to the shaft 84 and frame 86, once the two shafts 84 and 92 are inserted into each other as male and female, the only degree of freedom left is rotational, which does not effect the meshing of the gear transmission. The single fastener 20 in addition to holding the module 60 to its base or frame 86 is able to restrict this rotation freedom of movement. Thus, when the module 60 is connected to the frame 86 rotation of the shaft 92 by the drive motor 22 can cause the shaft 84 to rotate axially.

Figure 3:
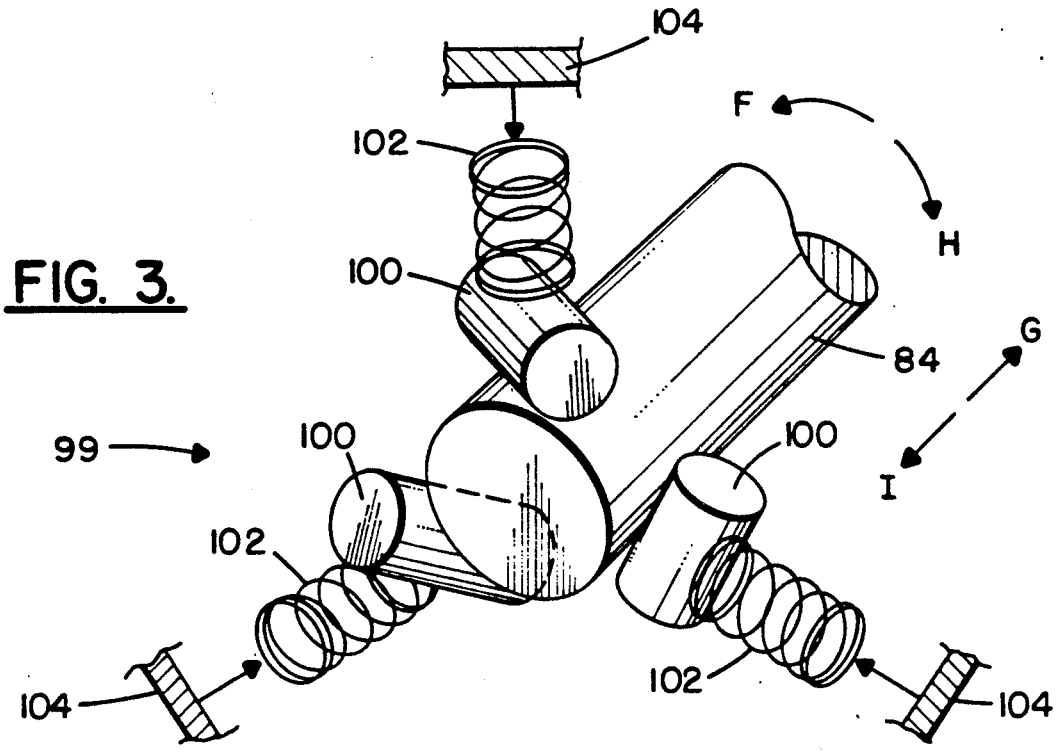
FIG. 3 is a schematic view of a shaft travel mechanism of the table shown in FIG. 1.

Referring now also to FIG. 3, there is shown a schematic view of the shaft travel mechanisms contained in the first travel mechanism 30, third travel mechanism 34 and fifth travel mechanism 42. The shaft travel mechanism 99 shown in FIG. 3 generally comprises a frame 104, tilted rollers 100 and springs 102. The shaft 84 is located between the tilted rollers 100 and makes frictional contact therewith. The tilted rollers 100 are biased against the shaft 84 by springs 102. The frame 104 provides a support for the springs 102 and contain the tilted rollers 100 and springs 102 within the shaft travel mechanism 99. In operation, when the shaft 84 is axially rotated in a clockwise direction as indicated by arrow F, the shaft travel mechanism 99 is frictionally moved along the shaft 84 in the direction indicated by arrow G. When the shaft 84 is axially rotated in the counter clockwise direction as indicated by arrow H the shaft travel mechanism 99 will be moved along the shaft 84 in the direction of the arrow I. Thus, the actual translation of the power supplied by shaft 92 to the movement of a frame member along a shaft 84 is accomplished with the relatively smooth shaft 84 rotating between the tilted rollers 100 that are spring loaded against it. The unique nature of this application is having no drive screw, its maintenance in a hostile environment is greatly eased. Furthermore, having a natural overdrive capability, the tilted rollers 100 will simply start to slip on the shaft 84 when the translational resistance exceeds a set value. This allows the elimination for the need of separate safety limit switches on both ends of the travel of the shaft 84.

A major requirement for equipment working in hostile environments is the ease of replacement of electrical components that tend to fail more frequently, and the ability to accomplish this replacement with remote means such as manipulators. Minimizing the number of fasteners, and arranging them into accessible patterns is imperative. Since visibility is also a problem it is necessary to insure that insertion of a module into a position is to be done without the need for viewing small features and handling small components. The electromechanical drive module described above fully meets these requirements. Another feature of the present invention is the combined use of the smooth shaft translator with a single home position sensor on one end of the travel of the translator in conjunction with a computer to provide intelligence to gain and retain absolute position control along the shaft travel. Another feature of the present invention is the disconnectable or demountable combined drive/sensor module that lends itself well for remote maintenance or replacement. In this solution, all electrical and electromechanical parts are combined into one module. Another feature of the present invention is the coupling and alignment method between the demountable drive/sensor module and the drive member which uniquely lends itself to remote handling while insuring critical alignment of rotating components without need for sensitive adjustments. Still another feature of the present invention is the use of single turn potentiometers to detect multi turn movements within the module and logically scrutinizing the output in software to define multi counting of cycle turns.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An examination table for use in a hostile environment having a frame, a movable table top, and means for controllably moving said table top relative to said frame, said moving means comprising:

shaft means fixedly mounted to said frame for axial rotation;

electromechanical drive means connected to said frame and said shaft means for rotating said shaft means; and shaft travel means for traveling along said shaft means, said shaft travel means comprising a plurality of tilted rollers, means for biasing said tilted rollers against said shaft means and means for connecting said shaft travel means to said table top such that rotation of said shaft means causes said tilted rollers to frictionally roll along said shaft means whereby said table top is moved parallel to said shaft means as said shaft means is rotated.

2. A table as in claim 1 wherein said shaft means comprises at least three shafts, each shaft oriented in a different plane.

3. A table as in claim 1 further comprising means for rotating said table top relative to said frame.

4. A table as in claim 3 further comprising means for tilting said table top relative to said frame.

5. A table as in claim 1 wherein said drive means comprises a shaft with a gear end for coaxial coupling with a gear end of said shaft means.

6. A table as in claim 5 wherein said drive means further comprises an idler pinion gear coupling said drive means shaft with said shaft means.

7. A table as in claim 6 further comprising a single fastener for mounting said drive means to said frame whereby said coaxial coupling of said drive means shaft and said shaft means, and said single fastener allows easy replacement of said drive means by use of a remote means.

8. A table as in claim further comprising sensor means to sense the position of said shaft travel means on said shaft means.

9. A table as in claim 8 further comprising computer means for processing information from said sensor means to gain and retain position control of said shaft travel means along said shaft means.

10. A table as in claim 8 wherein said sensor means and said drive means are contained in a module which is disconnectably mounted to said frame and said shaft means.

11. A table as in claim 10 further comprising single turn potentiometer means to detect multiple turn movements within said module.

12. An examination table having a frame, a movable table top, and means for controllably moving said table top relative to said frame, said moving means comprising:

shaft means mounted to said frame for axial rotation, said shaft means having a first end extending past said frame and a first gear at said first end;

drive means for rotating said shaft means, said drive means having a motor means, a drive shaft, a pinion gear means and a second gear, said drive shaft having a central aperture for at least partially receiving said shaft means first end with said pinion gear means connecting said first and second gears; and a single fastener for mounting said drive means to said frame.

* * * * *